US010619030B2

(12) United States Patent
Zhou

(10) Patent No.: US 10,619,030 B2
(45) Date of Patent: Apr. 14, 2020

(54) POLYMERIC PHOTO ACTIVE AGENTS

(71) Applicant: Hewlett-Packard Development Company, L.P., Spring, TX (US)

(72) Inventor: Zhang-Lin Zhou, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/339,144

(22) PCT Filed: Jan. 31, 2017

(86) PCT No.: PCT/US2017/015796
§ 371 (c)(1),
(2) Date: Apr. 3, 2019

(87) PCT Pub. No.: WO2018/143929
PCT Pub. Date: Aug. 9, 2018

(65) Prior Publication Data
US 2019/0233617 A1 Aug. 1, 2019

(51) Int. Cl.
| | | |
|---|---|---|
| *C08F 2/46* | (2006.01) | |
| *C08F 2/50* | (2006.01) | |
| *C08G 61/04* | (2006.01) | |
| *C08K 5/5397* | (2006.01) | |
| *C09D 11/101* | (2014.01) | |
| *C09D 11/54* | (2014.01) | |
| *C08G 65/335* | (2006.01) | |
| *C09D 11/40* | (2014.01) | |
| *C09D 11/38* | (2014.01) | |
| *C08G 65/26* | (2006.01) | |
| *C09D 11/102* | (2014.01) | |

(52) U.S. Cl.
CPC .............. *C08K 5/5397* (2013.01); *C08F 2/50* (2013.01); *C08G 65/2621* (2013.01); *C08G 65/3355* (2013.01); *C09D 11/101* (2013.01); *C09D 11/102* (2013.01); *C09D 11/38* (2013.01); *C09D 11/40* (2013.01); *C09D 11/54* (2013.01)

(58) Field of Classification Search
CPC ............ G11C 13/0069; G11C 13/0023; G11C 13/0097; G11C 13/004; G11C 13/0026; G11C 13/0028; G11C 16/08; G11C 16/24; H01L 27/2427; H01L 27/2463; H01L 45/141; H01L 45/06; H01L 45/1233; H01L 23/258; H01L 2924/002
USPC ............. 522/28, 7, 6, 1, 71, 189, 184; 520/1
See application file for complete search history.

(56) References Cited

U.S. PATENT DOCUMENTS

| | | |
|---|---|---|
| 6,486,226 B2 | 11/2002 | Al-Akhdar et al. |
| 9,353,211 B2 | 5/2016 | Madsen et al. |
| 9,371,308 B2 | 6/2016 | Madsen et al. |
| 2015/0105488 A1 | 4/2015 | Madsen et al. |

FOREIGN PATENT DOCUMENTS

| | | | |
|---|---|---|---|
| EP | 2960303 | | 12/2015 |
| EP | 2960303 A1 | * | 12/2015 |
| RU | 2394856 | | 7/2010 |
| WO | 2016122455 | | 8/2016 |
| WO | 2016122736 | | 8/2016 |
| WO | WO-2016122454 A1 | * | 8/2016 ........... C09D 11/101 |

OTHER PUBLICATIONS

International Search Report dated Oct. 12, 2017 for PCT/US2017/015796, Applicant Hewlett-Packard Development Company, L.P.
Sehnal et al., Novel Phosphine Oxide Photoinitiators, ResearchGate, Conference Paper, May 2014.

* cited by examiner

*Primary Examiner* — Jessica Whiteley
(74) *Attorney, Agent, or Firm* — Thorpe North & Western LLP

(57) ABSTRACT

The present disclosure is drawn to a polymeric photo active agent which includes diphenyl(2,4,6-trimethylbenzoyl) phosphine oxide modified with a polyether having from 2 to 200 ether groups.

17 Claims, 1 Drawing Sheet

TPO mixing a photo reactive binder; a co-photo initiator, a synergist, or combination thereof; a colorant; and a liquid vehicle including co-solvent and water with a polymeric photo active agent comprising diphenyl(2,4,6-trimethylbenzoyl)phosphine oxide modified with a polyether having from 2 to 200 ether groups — 210

POLYMERIC PHOTO ACTIVE AGENTS

BACKGROUND

Recently, curing of ink by radiation, and in particular ultraviolet (UV) curing, has become popular. UV curable ink can be cured after printing by application of UV light. Typically, UV curable inks include monomers that form polymers by free radical polymerization. The growing end of each polymer chain is a radical that reacts with additional monomers, transferring the radical to the end of the chain as each monomer is added. A photo initiator can be used to form first radicals to begin the polymerization process. The photo initiator can be capable of absorbing UV light to generate radicals to react with the monomers.

Two types of photo initiators can be used in UV curable compositions. Type I photo initiators are unimolecular photo initiators that undergo a hemolytic bond cleavage upon absorption of UV light, forming radicals. Type II photo initiators are bimolecular photo initiators. These are used as a system of a photo initiator with a synergist, which can together form radicals upon exposure to UV light. Some Type II photo initiators react by hydrogen abstraction from the synergist to the photo initiator.

DETAILED DESCRIPTION

Figures 1, 2:
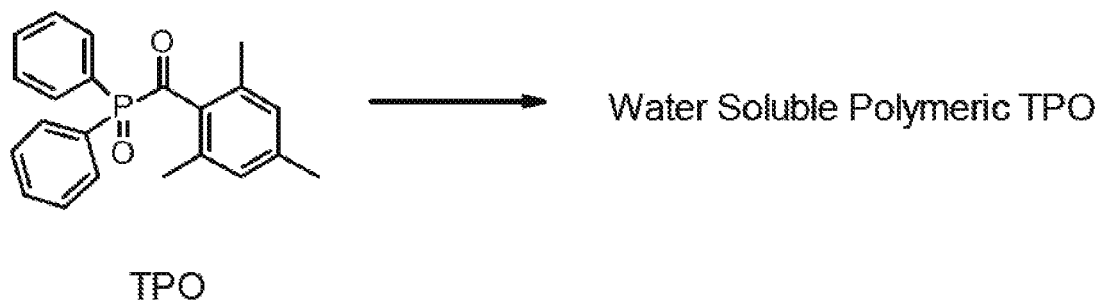
FIG. 1 is an example of a general scheme of forming a water soluble polymeric TPO compound in accordance with the present disclosure.
FIG. 2 depicts an example method of preparing a photo curable ink in accordance with the present disclosure.

The inkjet printing industry uses various types of inks, such as oil-based inks, solvent-based (non-aqueous) inks, water-based (aqueous) inks, and solid inks which are melted in preparation for dispensing. Solvent-based inks are fast drying, and as a result, are widely used for industrial printing. When solvent-based inks containing binders and other ingredients are jetted onto a substrate, the solvent(s) partially or fully evaporate from the ink, leaving the binder and other ingredients such as pigment particles on the printed substrate in the form of a dry film. During the drying process, the solvents, which are often volatile organic compounds (VOC), emit vapors, and therefore, can pollute the environment. The amount of pollution produced can increase greatly with higher printing speeds or for wide format images where large amounts of ink are deposited onto a substrate. As a result of this and other concerns, efforts related to preparing inks that are environmentally friendly have moved some research in the direction of water-based inks. However, radiation curable (or photo curable) water-based ink compositions are noticeably limited among available options due to their specific formulation properties. For example, even though one can use dispersions of photo initiators along with a dispersant, there can be crystal issues that get introduced at high concentrations in the ink. Thus, it would be desirable to develop water soluble and UV-LED reactive photo initiators, including those that may also be stable in photo curable ink formulations, have relatively high water solubility, and/or are chemical stable. In some specific examples, photo initiators (with or without a sensitizer) may also be desirable that have high reactivity to commercially available UV-LED lights, such as 395 nm LED lights. Furthermore, because the photo initiators described herein can be polymeric, and thus can have improved performance with respect to migration in water-based inks, e.g., migration is minimized.

Accordingly, the present disclosure is drawn to water soluble polymeric photo active agents that can be used as photo initiators, sensitizers, or both. More specifically, the present disclosure is drawn to polymeric photo active agents, including a diphenyl(2,4,6-trimethylbenzoyl)phosphine oxide modified with a polyether having from 2 to 200 ether groups. In one example, the polyether includes one of a polyethylene oxide or a polypropylene oxide. In another example, the polyether includes both a polyethylene oxide and a polypropylene oxide. In still other examples, the polyether can also be a polyetheramine. For example, the polyetheramine can be a tertiary amine attached to polyethylene oxide, polypropylene oxide, or a combination of both polyethylene oxide and polypropylene oxide. In another example, the polymeric photo active agent can also include a second diphenyl(2,4,6-trimethylbenzoyl)phosphine oxide that is attached to the diphenyl(2,4,6-trimethylbenzoyl)phosphine oxide through the polyether.

In another example, a photo curable ink can include a photo reactive binder; a polymeric photo active agent including diphenyl(2,4,6-trimethylbenzoyl)phosphine oxide modified with a polyether having from 2 to 200 ether groups; a co-photo initiator, a synergist, or combination thereof; a colorant; and a liquid vehicle including co-solvent and water. In this example, the polyether can include a polyethylene oxide, a polypropylene oxide, or both a polyethylene oxide and a polypropylene oxide. In another example, the polyether can be part of a polyetheramine. Furthermore, the polymeric photo active agent can also include a second diphenyl(2,4,6-trimethylbenzoyl)phosphine oxide, wherein the diphenyl(2,4,6-trimethylbenzoyl)phosphine oxide and the second diphenyl(2,4,6-trimethylbenzoyl)phosphine oxide are attached together by the polyether. These photo curable inks can have a pH of 7 to 12, and the polymeric photo active agent can be stable in the photo curable ink. The photo curable ink can be formulated to be photo curable using UV LED electromagnetic radiation. As the photo curable inks include a sensitizer or a co-photo initiator, the polymeric photo active agent can act in either capacity. For example, the polymeric photo active agent can be a sensitizer and the photo curable ink can include the co-photo initiator. Alternatively, the polymeric photo active agent can act as a photo initiator and the photo curable ink can include the synergist.

In another example, a method of making a photo curable ink can include mixing a photo reactive binder; a co-photo initiator, a synergist, or combination thereof; a colorant; and a liquid vehicle including co-solvent and water with a polymeric photo active agent including diphenyl(2,4,6-trimethylbenzoyl)phosphine oxide modified with a polyether having from 2 to 200 ether groups.

In further detail as it relates to the photo active agent, as mentioned, diphenyl(2,4,6-trimethylbenzoyl)phosphine oxide (TPO) can be modified with a polyether having from 2 to 200 ether groups, as shown in FIG. 1.

There are various structures that can be prepared to solubilize the TPO in water using polyethers. Essentially, the 3-position or the 5-position of the 2,4,6-trimethyl benzoyl ring portion of the TPO is available for modification with the polyether groups as described herein. In some examples, the polyether is attached directly to the trimethyl benzoyl ring, and in other examples, an amine group may be used to attach the TPO to the polyether. Regardless, various examples include the preparation of polyether-modified TPO. In various examples, TPO can be modified using Jeffamine® M (Formula I), polymeric TPO can be modified using monomethylated polyethylene glycol (Formula II), polymeric TPO can be modified using Jeffamine® D (Formula III), polymeric TPO can be modified using Jeffamine® XTJ (Formula IV), and polymeric TPO using polyethylene glycol (Formula V). Jeffamine® products are available from Huntsman Corporation of Woodlands, Tex. Notably, Jeffamine® products used in these examples can include polyethylene glycol and/or polypropylene glycol. These five examples (I-V) are provided below:

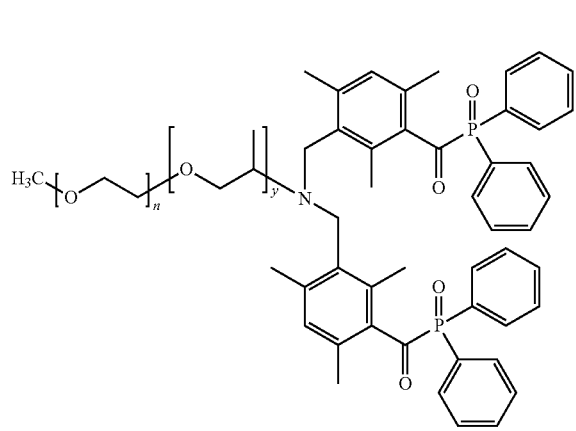

(I)

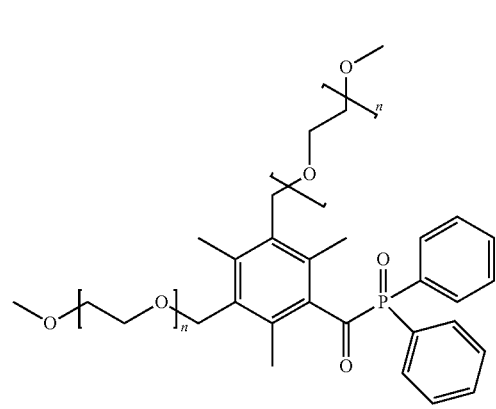

(II)

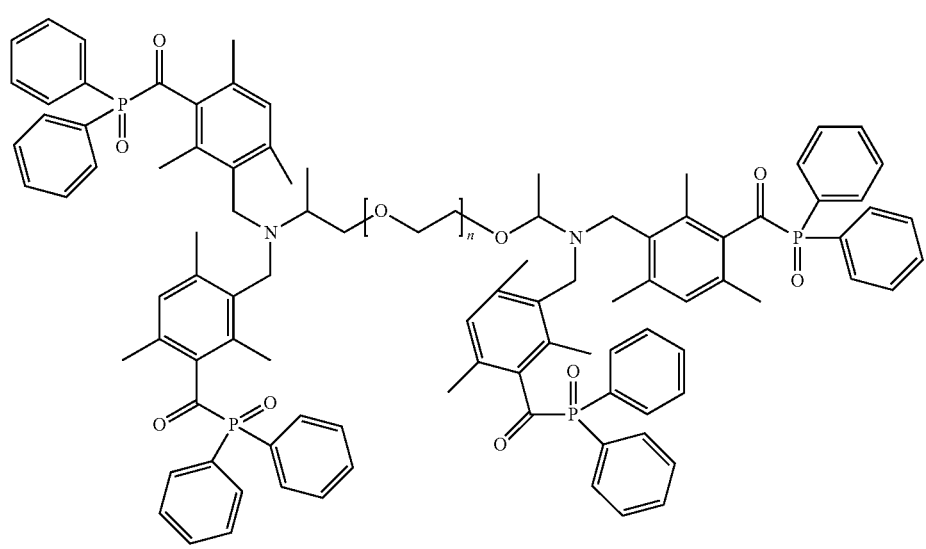

(III)

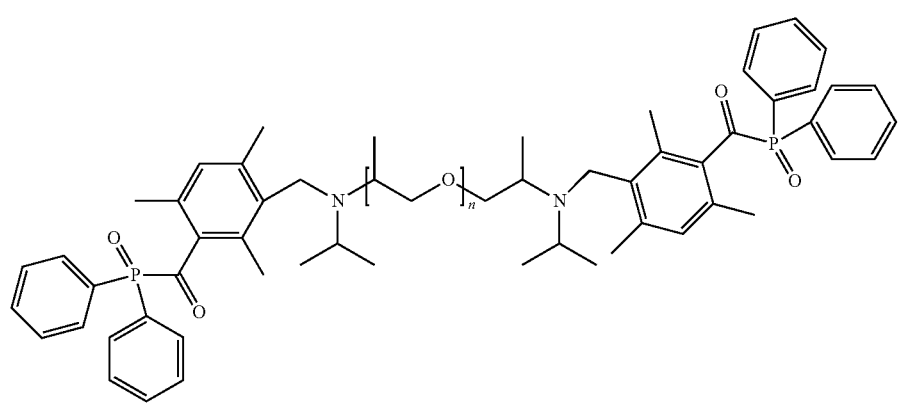

(IV)

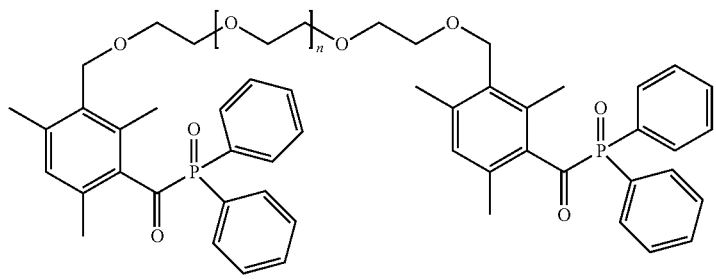

(V)

In Formulas I-V above, n can be from 0 to 200 and p can be from 0 to 200 m with the proviso that n+p is at least 2.

There are various synthetic methods that can be used to prepare these compounds (Formulas I-V). For example, as shown in Scheme 1 below, reaction of commercially available TPO (1) with 3 equivalents of paraformaldehyde in the presence of AlCl₃ in chloroform at 0° C., followed by heating at 60° C., gives the corresponding TPO chloride (2). Reaction of 2 equivalents of TPO chloride (2) with Jeffamine® M in the presence of K₂CO₃ in acetonitrile under reflux gives a polymeric TPO based on Jeffamine® M (Formula I).

followed by heating at 60° C., gives the corresponding TPO di-chloride (4). Reaction of TPO di-chloride (4) with 2 equiv of mono-methylated polyethylene glycol (5) in the presence of NaH in THF at 0° C. to room temperature, gives a polymeric TPO based on mono-methylated polyethylene glycol (Formula II).

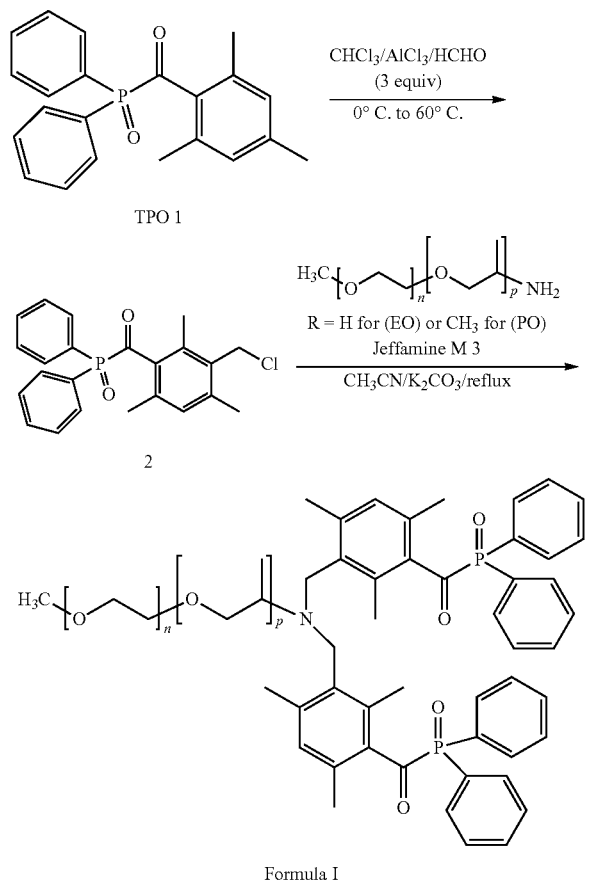

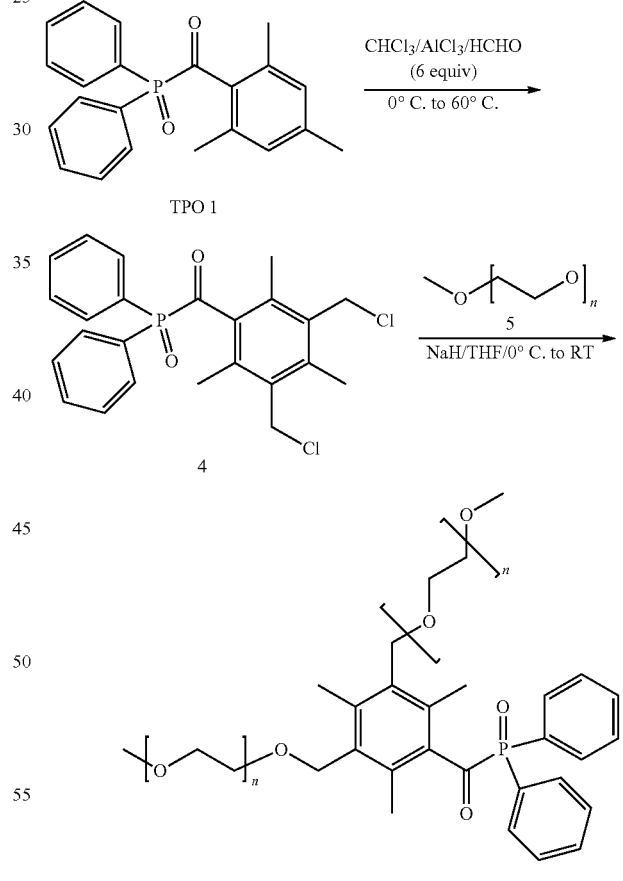

Similarly, as shown in Scheme 2, reaction of commercially available TPO (1) with 6 equivalents of paraformaldehyde in the presence of AlCl₃ in chloroform at 0° C., As shown in Scheme 3, reaction of 4 equivalents of TPO chloride (2) with Jeffamine® D (6) in the presence of K₂CO₃ in acetonitrile under reflux gives the desired polymeric TPO based on Jeffamine® D (Formula III).

Scheme 3
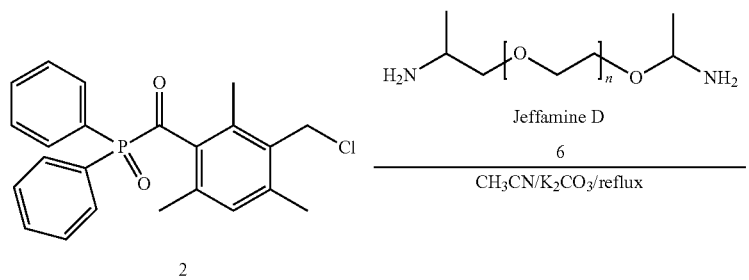
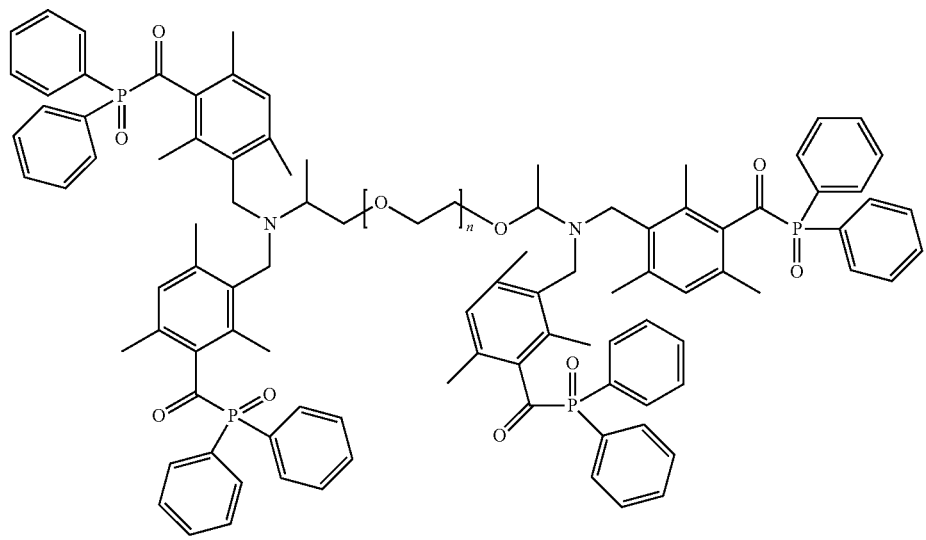
Formula III
As shown in Scheme 4, reaction of 2 equivalents of TPO chloride (2) with Jeffamine® XTJ (7) in the presence of K$_2$CO$_3$ in acetonitrile under reflux gives the desired polymeric TPO based on Jeffamine® XTJ (Formula IV).
Scheme 4
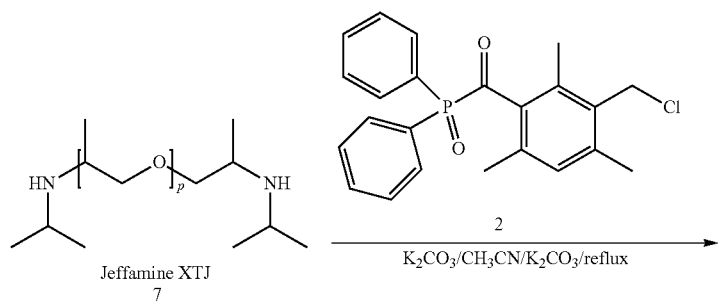

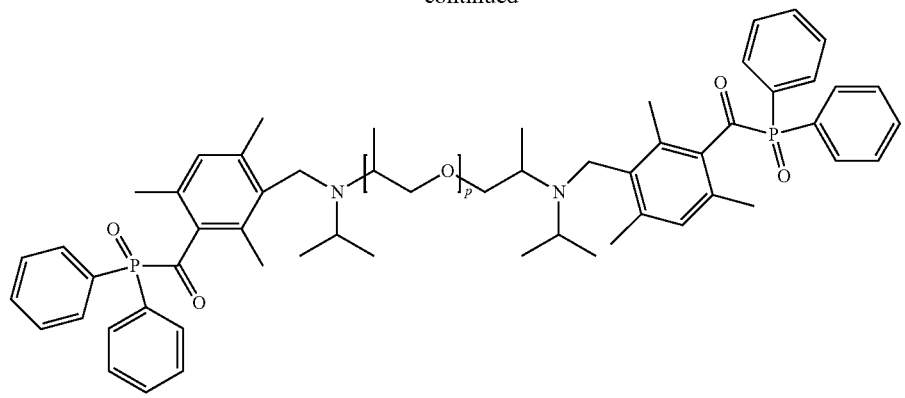

Formula IV

As shown in Scheme 5, reaction of 2 equivalents of TPO chloride (2) with polyethylene glycol (8) in the presence of NaH in THF at 0° C. to room temperature, gives a polymeric TPO based on polyethylene glycol (Formula V).

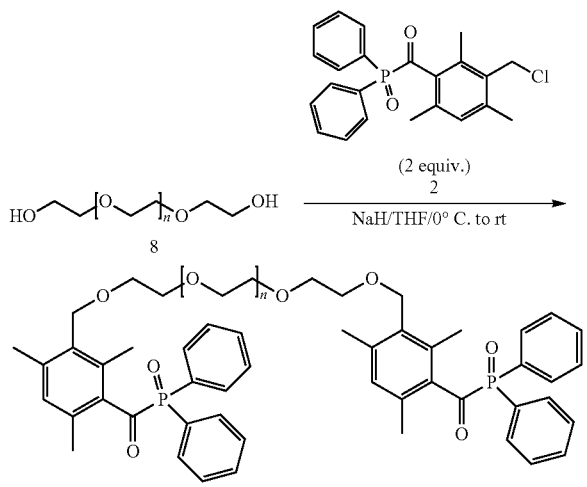

Formula V

The present disclosure also extends to photo curable inks, such as UV curable inks including LED curable inks. In some examples, a photo curable ink can include a photo reactive binder (such as a UV curable or LED curable binder), a polymeric photo active agent, a co-photo initiator and/or a synergist, a colorant, a co-solvent, and water. The polymeric photo active agent can be the PTO modified with a polyether chain as described herein. In various aspects, the polymeric photo active agent can act as a photo initiator with the synergist, or it can act as a sensitizer for a co-photo initiator, for example.

In some cases, the photo reactive binder can include a UV or LED curable polyurethane and hydrophobic radiation-curable monomers. In one example, the UV reactive binder can include a water dispersible (meth)acrylated polyurethane, such as NeoRad® R-441 by NeoResins (Avecia). Other examples of UV reactive binders can include Uce-coat® 7710, Ucecoat® 7655 (available from Cytec), Neo-rad® R-440, Neorad® R-441, Neorad® R-447, Neorad® R-448 (available from DSM NeoResins), Bayhydrol® UV 2317, Bayhydrol® UV VP LS 2348 (available from Bayer), Lux 430, Lux 399, Lux 484 (available from Alberdingk Boley), Laromer® LR 8949, Laromer® LR 8983, Laromer® PE 22WN, Laromer® PE 55WN, Laromer® UA 9060 (available from BASF), or combinations thereof.

The polymeric photo active agents of the present disclosure can act as a Type I or a Type II photo initiator. Thus, the photo curable ink can include a synergist so that the photo initiator and synergist together can generate radicals during photo curing, such as with UV curing or even LED curing processes. In some examples, the synergist can be an amine synergist. The amine synergist can be a tertiary amine compound. In one example, the amine synergist can be a polymeric amine synergist such as a derivative of aniline and a polyether amine such as Jeffamine® 900. In other examples, the amine synergist can be trimethylamine, triethanolamine, methyldiethanolamine, phenyldiethanolamine, N,N,N',N'-tetra(hydroxylethyl)ethylenediamine, dimethylaminoethyl acrylate, dimethylaminoethyl methacrylate, ethyl dimethylaminobenzoate, or combinations thereof.

In another example, the polymeric photo active agents of the present disclosure can act as the primary photo initiator in the photo curable ink, or they can act as a sensitizer for another photo initiator. Therefore, the photo curable ink can, in some cases, include a second photo initiator in addition to the polymeric photo active agents disclosed herein. Examples of radical photo initiators include, by way of illustration and not limitation, 1-hydroxy-cyclohexylphenylketone, benzophenone, 2,4,6-trimethylbenzo-phenone, 4-methylbenzophenone, diphenyl-(2,4,6-trimethylbenzoyl) phosphine oxide, phenyl bis(2,4,6trimethylbenzoyl)phosphine oxide, 2-hydroxy-2-methyl-1-phenyl-1-propanone, benzyl-dimethyl ketal, 2-methyl-1-[4-(methylthio)phenyl]-2-morpholinopropan-1-one, or combinations thereof. Non-limiting examples of additional photo initiators include alpha amino ketone UV photo initiators such as Ciba® Irgacure® 907, Ciba® Irgacure® 369, and Ciba® Irgacure® 379; bis acylphosphine oxide (BAPO) UV photo initiators such as Irgacure® 819, Darocur® 4265, and Darocur® TPO; alpha hydroxy ketone UV photo initiators such as Irgacure® 184 and Darocur® 1173; including photo initiators with or without sensitizers such as Darocur® ITX (2-isopropyl thioxanthone).

The colorant in the photo curable ink can be a pigment, a dye, or a combination thereof. In some examples, the colorant can be present in an amount from 0.5 wt % to 10 wt % in the photo curable ink. In one example, the colorant can be present in an amount from 1 wt % to 5 wt %. In another example, the colorant can be present in an amount from 5 wt % to 10 wt %.

In some examples, the colorant can be a dye. The dye can be nonionic, cationic, anionic, or a mixture of nonionic, cationic, and/or anionic dyes. Specific examples of dyes that can be used include, but are not limited to, Sulforhodamine B, Acid Blue 113, Acid Blue 29, Acid Red 4, Rose Bengal, Acid Yellow 17, Acid Yellow 29, Acid Yellow 42, Acridine Yellow G, Acid Yellow 23, Acid Blue 9, Nitro Blue Tetrazolium Chloride Monohydrate or Nitro BT, Rhodamine 6G, Rhodamine 123, Rhodamine B, Rhodamine B Isocyanate, Safranine O, Azure B, and Azure B Eosinate, which are available from Sigma-Aldrich Chemical Company (St. Louis, Mo.). Examples of anionic, water-soluble dyes include, but are not limited to, Direct Yellow 132, Direct Blue 199, Magenta 377 (available from Ilford AG, Switzerland), alone or together with Acid Red 52. Examples of water-insoluble dyes include azo, xanthene, methine, polymethine, and anthraquinone dyes. Specific examples of water-insoluble dyes include Orasol® Blue GN, Orasol® Pink, and Orasol® Yellow dyes available from Ciba-Geigy Corp. Black dyes may include, but are not limited to, Direct Black 154, Direct Black 168, Fast Black 2, Direct Black 171, Direct Black 19, Acid Black 1, Acid Black 191, Mobay Black SP, and Acid Black 2.

In other examples, the colorant can be a pigment. The pigment can be self-dispersed with a polymer, oligomer, or small molecule; or can be dispersed with a separate dispersant. Suitable pigments include, but are not limited to, the following pigments available from BASF: Paliogen® Orange, Heliogen® Blue L 6901F, Heliogen® Blue NBD 7010, Heliogen® Blue K 7090, Heliogen® Blue L 7101F, Paliogen® Blue L 6470, Heliogen® Green K 8683, and Heliogen® Green L 9140. The following black pigments are available from Cabot: Monarch® 1400, Monarch® 1300, Monarch® 1100, Monarch® 1000, Monarch® 900, Monarch® 880, Monarch® 800, and Monarch® 700. The following pigments are available from CIBA: Chromophtal® Yellow 3G, Chromophtal® Yellow GR, Chromophtal® Yellow 8G, Igrazin® Yellow 5GT, Igralite® Rubine 4BL, Monastral® Magenta, Monastral® Scarlet, Monastral® Violet R, Monastral® Red B, and Monastral® Violet Maroon B. The following pigments are available from Degussa: Printex® U, Printex® V, Printex® 140U, Printex® 140V, Color Black FW 200, Color Black FW 2, Color Black FW 2V, Color Black FW 1, Color Black FW 18, Color Black S 160, Color Black S 170, Special Black 6, Special Black 5, Special Black 4A, and Special Black 4. The following pigment is available from DuPont: Tipure® R-101. The following pigments are available from Heubach: Dalamar® Yellow YT-858-D and Heucophthal Blue G XBT-583D. The following pigments are available from Clariant: Permanent Yellow GR, Permanent Yellow G, Permanent Yellow DHG, Permanent Yellow NCG-71, Permanent Yellow GG, Hansa Yellow RA, Hansa Brilliant Yellow 5GX-02, Hansa Yellow-X, Novoperm® Yellow HR, Novoperm® Yellow FGL, Hansa Brilliant Yellow 10GX, Permanent Yellow G3R-01, Hostaperm® Yellow H4G, Hostaperm® Yellow H3G, Hostaperm® Orange GR, Hostaperm® Scarlet GO, and Permanent Rubine F6B. The following pigments are available from Mobay: Quindo® Magenta, Indofast® Brilliant Scarlet, Quindo® Red R6700, Quindo® Red R6713, and Indofast® Violet. The following pigments are available from Sun Chemical: L74-1357 Yellow, L75-1331 Yellow, and L75-2577 Yellow. The following pigments are available from Columbian: Raven® 7000, Raven® 5750, Raven® 5250, Raven® 5000, and Raven® 3500. The following pigment is available from Sun Chemical: LHD9303 Black. Any other pigment and/or dye can be used that is useful in modifying the color of the UV curable ink. Additionally, the colorant can include a white pigment such as titanium dioxide, or other inorganic pigments such as zinc oxide and iron oxide.

The components of the photo curable ink can be selected to give the ink good ink jetting performance. Besides the photo curable binder, photo reactive polymeric photo active agents, and the colorant, the photo curable ink can also include a liquid vehicle. Liquid vehicle formulations that can be used in the photo curable ink can include water and one or more co-solvents present in total at from 1 wt % to 50 wt %, depending on the jetting architecture. Further, one or more non-ionic, cationic, and/or anionic surfactant can be present, ranging from 0.01 wt % to 20 wt %. In one example, the surfactant can be present in an amount from 5 wt % to 20 wt %. The liquid vehicle can also include dispersants in an amount from 5 wt % to 20 wt %. The balance of the formulation can be purified water, or other vehicle components such as biocides, viscosity modifiers, materials for pH adjustment, sequestering agents, preservatives, or the like. In one example, the liquid vehicle can be predominantly water, e.g., more than 50 wt % water.

Classes of co-solvents that can be used can include organic co-solvents including aliphatic alcohols, aromatic alcohols, diols, glycol ethers, polyglycol ethers, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. Specific examples of solvents that can be used include, but are not limited to, 2-pyrrolidinone, N-methylpyrrolidone, 2-hydroxyethyl-2-pyrrolidone, 2-methyl-1,3-propanediol, tetraethylene glycol, 1,6-hexanediol, 1,5-hexanediol and 1,5-pentanediol.

One or more surfactants can also be used, such as alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like. The amount of surfactant added to the formulation of this disclosure may range from 0.01 wt % to 20 wt %. Suitable surfactants can include, but are not limited to, liponic esters such as Tergitol™ 15-S-12, Tergitol™ 15-S-7 available from Dow Chemical Company, LEG-1 and LEG-7; Triton™ X-100; Triton™ X-405 available from Dow Chemical Company; LEG-1, and sodium dodecylsulfate.

Consistent with the formulation of this disclosure, various other additives can be employed to optimize the properties of the ink composition for specific applications. Examples of these additives are those added to inhibit the growth of harmful microorganisms. These additives may be biocides, fungicides, and other microbial agents, which are routinely used in ink formulations. Examples of suitable microbial agents include, but are not limited to, NUOSEPT® (Nudex, Inc.), UCARCIDE™ (Union carbide Corp.), VANCIDE® (R.T. Vanderbilt Co.), PROXEL® (ICI America), and combinations thereof.

Sequestering agents, such as EDTA (ethylene diamine tetra acetic acid), may be included to eliminate the deleterious effects of heavy metal impurities, and buffer solutions may be used to control the pH of the ink. From 0.01 wt % to 2 wt %, for example, can be used. Viscosity modifiers and buffers may also be present, as well as other additives to modify properties of the ink as desired. Such additives can be present at from 0.01 wt % to 20 wt %.

Table 1 shows the composition of an example of a photo curable ink, e.g., UV LED curable ink, formulation in accordance with the present disclosure. The ink can be formulated by mixing these ingredients or by other formulations. The pH of the ink can then be adjusted. In one example, the ingredients can be stirred for 30 minutes and then aqueous potassium hydroxide can be added to adjust the pH to 7 to 12, or in other examples, from 8 to 10, or about 8.5. It is noted that though water concentrations are listed as "balance," it is understood that the balance of components could included other liquid vehicle components or minor amounts of solids often present in inkjet ink compositions.

TABLE 1

| Component | Weight Percent |
| --- | --- |
| Photo reactive binder (UV reactive polymer) | 1-20% |
| Polymeric photo active agent (sensitizer or photo initiator) | 0.15-5% |
| Co-photo initiator | *0-10% |
| Synergist | *0-5% |
| Surfactant | 0-20% |
| Anti-kogation agent | 0-5% |
| Pigment | 0.5-10% |
| Organic Co-solvent | 0.1-50% |
| Water | remainder |

*As noted, when the polymeric photo active agent is included as a sensitizer, the co-photo initiator is at greater than 0%. When the polymeric photo active agent is included as a photo initiator, the synergist is at greater than 0%.

All three components can likewise be present, i.e. the polymeric photo active agent, the co-photo initiator, and the synergist.

The photo curable ink can be used to print on a broad selection of substrates including untreated plastics, flexible as well as rigid, porous substrates such as paper, cardboard, foam board, textile, and others. The ink has a good adhesion on a variety of substrates. The photo curable ink also has a good viscosity, enabling good printing performances and enabling the ability to formulate inks suitable for inkjet applications. In some examples, the ink can be formulated for thermal inkjet printing. The photo curable ink composition of the present disclosure provides for high printing speed and is very well suited for use in digital inkjet printing.

The polymeric photo active agents of the present disclosure can be stable in aqueous environments at pH from 7 to 12 or higher. Thus, the photo curable ink can be formulated to have a pH from 7 to 12 or higher. In some examples, the photo curable ink can have a pH of 8 or higher, e.g., 8 to 12 or 8 to 10. In one specific example, the photo curable ink can have a pH of about 8.5.

The polymeric photo active agent can exhibit less migration in cured ink compared with small molecule photo initiators. The photo curable binder in the ink can include polymers or monomers that polymerize or cross-link during the curing process. As the binder cures, the polymeric photo active agent can become locked into the cured binder due to the long polyether chain of the polymeric photo active agent. Therefore, the photo curable ink can be formulated so that there is little or no migration of the polymeric photo active agent in the ink after curing.

As mentioned, the present disclosure also extends to a method of making a photo curable ink, as shown generally at FIG. 2. The method includes mixing 210 a photo reactive binder; a co-photo initiator, a synergist, or combination thereof; a colorant; and a liquid vehicle including co-solvent and water with a polymeric photo active agent including diphenyl(2,4,6-trimethylbenzoyl)phosphine oxide modified with a polyether having from 2 to 200 ether groups. The photo curable ink can be UV curable, and in one specific example, UV LED curable. In one example, the method can also include adjusting the pH of the ink to be from 7 to 12. In another example, the method can include adjusting the pH of the ink from 8 to 10.

It is to be understood that this disclosure is not limited to the particular process steps and materials disclosed herein because such process steps and materials may vary somewhat. It is also to be understood that the terminology used herein is used for the purpose of describing particular examples only. The terms are not intended to be limiting because the scope of the present disclosure is intended to be limited only by the appended claims and equivalents thereof.

It is noted that, as used in this specification and the appended claims, the singular forms "a," "an," and "the" include plural referents unless the context clearly dictates otherwise.

As used herein, "polymeric photo active agent" refers to materials that participate in the initiation of photo polymerization, particularly materials that act as a photo initiator or a sensitizer for a photo initiator. The polymeric photo active agents disclosed herein can be used either as a photo initiator or as a sensitizer for another photo initiator. In some systems, the polymeric photo active agent can act as both a photo initiator and a sensitizer.

As used herein, "UV curable" refers to compositions that can be cured by exposure to ultraviolet light from any UV source such as a mercury vapor lamp, UV LED source, or the like. Mercury vapor lamps emit high intensity light at wavelengths from 240 nm to 270 nm and 350 nm to 380 nm. There are also ultraviolet LEDs available at 365 nm and 395 nm wavelengths, among others. "LED curable" refers to compositions that can be cured by ultraviolet light from an ultraviolet source, such as an Ultraviolet LED (or UV LED) which emits light at a specific wavelength. The term "photo curable" refers generally to compositions that can be cured by exposure to light from any wavelength suitable for the composition being cured. Typically, the photo curable composition will be UV curable, and in some cases UV LED curable.

As used herein, "liquid vehicle" or "ink vehicle" refers to a liquid fluid in which colorant is placed to form an ink. A wide variety of ink vehicles may be used with the systems and methods of the present disclosure. Such ink vehicles may include a mixture of a variety of different agents, including, surfactants, solvents, co-solvents, anti-kogation agents, buffers, biocides, sequestering agents, viscosity modifiers, surface-active agents, water, etc.

As used herein, "colorant" can include dyes and/or pigments.

As used herein, "dye" refers to compounds or molecules that absorb electromagnetic radiation or certain wavelengths thereof. Dyes can impart a visible color to an ink if the dyes absorb wavelengths in the visible spectrum.

As used herein, "pigment" generally includes pigment colorants, magnetic particles, aluminas, silicas, and/or other ceramics, organo-metallics or other opaque particles, whether or not such particulates impart color. Thus, though the present description primarily exemplifies the use of pigment colorants, the term "pigment" can be used more generally to describe not only pigment colorants, but other pigments such as organometallics, ferrites, ceramics, etc. In one specific example, however, the pigment is a pigment colorant.

As used herein, "ink-jetting" or "jetting" refers to compositions that are ejected from jetting architecture, such as ink-jet architecture. Ink-jet architecture can include thermal or piezo architecture. Additionally, such architecture can be configured to print varying drop sizes such as less than 10 picoliters, less than 20 picoliters, less than 30 picoliters, less than 40 picoliters, less than 50 picoliters, etc.

As used herein, the term "substantial" or "substantially" when used in reference to a quantity or amount of a material, or a specific characteristic thereof, refers to an amount that is sufficient to provide an effect that the material or characteristic was intended to provide. The exact degree of deviation allowable may in some cases depend on the specific context.

As used herein, the term "about" is used to provide flexibility to a numerical range endpoint by providing that a given value may be "a little above" or "a little below" the endpoint. The degree of flexibility of this term can be dictated by the particular variable and determined based on the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also the individual numerical values or sub-ranges encompassed within that range as if each numerical value and sub-range is explicitly recited. As an illustration, a numerical range of "about 1 wt % to about 5 wt %" should be interpreted to include not only the explicitly recited values of about 1 wt % to about 5 wt %, but also the individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

EXAMPLES

The following illustrates several examples of the present disclosure. However, it is to be understood that the following are only illustrative of the application of the principles of the present disclosure. Numerous modifications and alternative compositions, methods, and systems may be devised without departing from the spirit and scope of the present disclosure. The appended claims are intended to cover such modifications and arrangements.

Example 1—Synthesis of TPO Chloride (2)

A mixture of 5.0 grams (14.3 mmol) of commercially available TPO (1) in 100 mL of chloroform was cooled to 0° C. under $N_2$ and mechanical stirring was added portion-wise $AlCl_3$ (12.0 grams, 85.8 mmol) and paraformaldehyde (1.3 grams, 43 mmol). After the completion of the addition, the mixture was heated to 60° C. for 6 hours. The reaction mixture was cooled to room temperature and poured into ice-water. The mixture was extracted with dichloromethane (3×100 mL). The combined organic layers were washed by water, brine and then dried over sodium sulfate. Evaporation of solvent gave a residue, which was further purified by flash chromatography using hexanes/ethyl acetate (100% hexanes to 50% hexanes in ethyl acetate) as eluents, giving rise to 3.7 grams (65%) of TPO chloride (2), as shown in Schemes 1, 3, 4, and 5.

Example 2—Synthesis of TPO Di-Chloride (4)

A mixture of 5.0 grams (14.3 mmol) of commercially available TPO (1) in 100 mL of chloroform was cooled to 0° C. under $N_2$ and mechanical stirring was added portion-wise $AlCl_3$ (12.0 grams, 85.8 mmol) and paraformaldehyde (2.6 grams, 86 mmol). After the completion of the addition, the mixture was heated to 60° C. for 12 hours. Then, the reaction mixture was cooled to room temperature and poured into ice-water. The mixture was extracted with dichloromethane (3×100 mL). The combined organic layers were washed by water, brine and then dried over sodium sulfate. Evaporation of solvent gave a residue, which was further purified by flash chromatography using hexanes/ethyl acetate (100% hexanes to 50% hexanes in ethyl acetate) as eluents, giving rise to 3.8 grams (60%) of TPO-dichloride (4), as shown in Scheme 2.

Example 3—Synthesis of Polymeric TPO Based on Jeffamine® D (Formula III)

To a solution of TPO chloride (2) (15.88 grams, 40 mmol) in 150 mL of acetonitrile and 50 mL of THF was added potassium carbonate (5.52 grams, 40 mmol). To the above mixture was added a solution of Jeffamine® ED-900 (6) (9.0 grams, 10 mmol) in 50 mL of THF. After the completion of the addition, the reaction mixture was stirred under reflux for 24 hours. Then the reaction mixture was cooled to room temperature. The solid was filtered off by filtration and washed with ethyl acetate. The combined organic layers were washed by water, brine and then dried over sodium sulfate. Evaporation of solvent gave a residue, which was further purified by flash chromatography using hexanes/ethyl acetate (100% hexanes to 50% hexanes in ethyl acetate) as eluents, giving rise to 20.15 grams (85%) of the polymeric TPO of Formula III.

Example 4—Synthesis of polymeric TPO based on Mono-Methylated Polyethylene Glycol (Formula II)

To a solution of mono-methylated polyethylene glycol (5) (1.65 g, 2.2 mmol) in 25 mL of THF was added potassium tert-butoxide (300 mg, 2.65 mmol). The resulting mixture was stirred at 50° C. for 2 hours. After cooling to room temperature, this mixture was added dropwise to a solution of TPO di-chloride (4) (445 mg, 1.0 mmol) in 25 mL of THF at 0° C. under $N_2$ atmosphere. The resulting mixture was allowed to stir at 50° C. for an additional 3 hours. The reaction mixture was cooled to room temperature and poured into ice-water. The mixture was extracted with dichloromethane (3×100 mL). The combined organic layers were washed by water, brine and then dried over sodium sulfate. Evaporation of solvent gave a residue, which was further purified by flash chromatography using hexanes/ ethyl acetate (100% hexanes to 50% hexanes in ethyl acetate) as eluents, giving rise to 1.4 grams (75%) of the polymeric TPO based on mono-methylated polyethylene glycol of Formula II.

Example 5—Photo Curable Ink 1

A photo (UV LED) curable inkjet ink is prepared by mixing the following components as shown in Table 1.

TABLE 1

| Component | Weight Percent |
|---|---|
| UV reactive binder | 15% |
| Irgacure ® 819 (co-photo initiator from BASF) | 0.3% |
| Thioxanthone derivative of PEG-600 (sensitizer) | 0.5% |
| Polymeric TPO (Formula I photo initiator) | 0.5% |
| LEG-1 (surfactant) | 1% |
| Surfynol ® CT-211 (surfactant from Air Products) | 1% |
| Crodafos ® N3 (anti-kogation agent from Croda Inc.) | 0.5% |
| Pigments | 2.5% |
| 2-hydroxyethyl-2-pyrrolidone (co-solvent) | 10% |
| Water | 69.2% |

Example 6—Photo Curable Ink 2

A photo curable inkjet ink is prepared by mixing the following components as shown in Table 2.

TABLE 2

| Component | Weight Percent |
|---|---|
| UV reactive binder | 5% |
| Thioxanthone derivative of PEG-600 (Sensitizer) | 0.25% |
| Polymeric TPO (Formula II photo initiator) | 0.5% |
| LEG-1 (surfactant) | 1% |
| Surfynol ® CT-211 (surfactant from Air Products) | 0.5% |
| Crodafos ® N3 (anti-kogation agent from Croda Inc.) | 0.5% |
| Pigments | 3% |
| 2-hydroxyethyl-2-pyrrolidone (co-solvent) | 10% |
| Water | 79.15% |

Example 7—Photo Curable Ink 3

A photo curable inkjet ink is prepared by mixing the following components as shown in Table 3.

TABLE 3

| Component | Weight Percent |
|---|---|
| UV reactive binder | 10% |
| Thioxanthone derivative of PEG-600 (Sensitizer) | 0.25% |
| Polymeric TPO (Formula III photo initiator) | 0.5% |
| LEG-1 (surfactant) | 1% |
| Surfynol ® CT-211 (surfactant from Air Products) | 0.5% |
| Crodafose ® N3 (anti-kogation agent from Croda Inc.) | 0.5% |
| Pigments | 3% |
| 2-hydroxyethyl-2-pyrrolidone (co-solvent) | 10% |
| Water | 74.15% |

Example 8—Photo Curable Ink 4

A photo (UV LED) curable inkjet ink is prepared by mixing the following components as shown in Table 4.

TABLE 4

| Component | Weight Percent |
|---|---|
| UV reactive binder | 15% |
| Irgacure ® 819 (co-photo initiator from BASF) | 0.3% |
| Thioxanthone derivative of PEG-600 (Sensitizer) | 0.5% |
| Polymeric TPO (Formula IV photo initiator) | 1% |
| LEG-1 (surfactant) | 1% |
| Surfynol ® CT-211 (surfactant from Air Products) | 1% |
| Crodafos ® N3 (anti-kogation agent from Croda Inc.) | 0.5% |
| Pigments | 2.5% |
| 2-hydroxyethyl-2-pyrrolidone (co-solvent) | 10% |
| Water | 68.7% |

Example 9—Photo Curable Ink 5

A photo (UV LED) curable inkjet ink is prepared by mixing the following components as shown in Table 5.

TABLE 5

| Component | Weight Percent |
|---|---|
| UV reactive binder | 15% |
| Irgacure ® 819 (co-photo initiator from BASF) | 0.3% |
| Thioxanthone derivative of PEG-600 (Sensitizer) | 0.5% |
| Polymeric TPO (Formula V photo initiator) | 3% |
| LEG-1 (surfactant) | 1% |
| Surfynol ® CT-211 (surfactant from Air Products) | 1% |
| Crodafos ® N3 (anti-kogation agent from Croda Inc.) | 0.5% |
| Pigments | 2.5% |
| 2-hydroxyethyl-2-pyrrolidone (co-solvent) | 10% |
| Water | 66.7% |

Example 10—Photo Curable Ink 6

A photo (UV LED) curable inkjet ink is prepared by mixing the following components as shown in Table 6.

TABLE 6

| Component | Weight Percent |
|---|---|
| UV reactive binder | 15% |
| Irgacure ® 819 (co-photo initiator from BASF) | 0.3% |
| Thioxanthone derivative of PEG-600 (Sensitizer) | 0.5% |
| Polymeric TPO (Formula V photo initiator) | 5% |
| LEG-1 (surfactant) | 1% |
| Surfynol ® CT-211 (surfactant from Air Products) | 1% |
| Crodafos ® N3 (anti-kogation agent from Croda Inc.) | 0.5% |
| Pigments | 2.5% |
| 2-hydroxyethyl-2-pyrrolidone (co-solvent) | 10% |
| Water | 64.7% |

Example 11—Preparation of Photo Curable Ink 1

Photo Curable Ink 1 was prepared in accordance with the following steps. Notably, Photo Curable Inks 2-6 can be prepared using similar steps. As a first batch, a UV reactive polyurethane dispersion (UV reactive binder) was mixed with a minor portion of the total water (less than about 30 wt %) and the Irgacure 819 (co-photo initiator) at 60° C. for 5 minutes. As a second batch, 2-hydroxyethyl-2-pyrrolidone (co-solvent) was mixed with a larger portion of the total water content (less than about 70 wt %) and Crodafos® N3A, CT211, and LEG-1. The second batch was neutralized to a pH of 7.5 with KOH solution. The first batch and the second batch were then combined. Next, a thioxanthone derivative of PEG-600 (sensitizer) and polymeric TPO (photo initiator) were added and mixed well until they dissolved into mixture. The black pigment dispersion was then added to the admixture and the pH was adjusted to 8.5 using KOH solution. Notably, some additional water content was added during subsequent steps after combing the first and second batch, resulting in the water content listed in Table 1.

A print durability test was then conducted using Photo Curable Ink 1, as follows:

Sample Preparation
1. The Photo Curable Ink was filled into thermal inkjet pen.
2. Fixer was printed from a different pen right before the ink was printed. The fixer formulation was a solution of calcium propionate, calcium nitrate tetrahydrate, Surfynol® SEF, tetraethylene glycol, and water.
3. Two paper substrates were evaluated:
   a. Offset coated paper—Sterling® Ultra Gloss (SUG), and
   b. White Top coated Kraft Liner—RockTenn® 1 (RT1).
4. The ink was immediately dried using hot air blower for 5 seconds at 375° F.
5. The dried ink was then immediately cured at a speed of 100 feet per minute using a 16 W/cm² LED 395 nm wavelength (from Phoseon).

Durability Measurements
1. Wet Rub Test
   a. This test was performed after a pre-defined time period after printing and curing. For SUG it was performed 24 hours after printing, and for RT1 it was preformed 72 hours after printing.
   b. A taber test tool was used with Crockmeier cloth attached to the tip.
   c. The weight load was 350 gram.
   d. One (1) cycle was used for SUG, and two (2) cycles was used for RT1.
   e. The solution was Windex®;
   f. For the Wet Rub Test, the delta optical density (ΔOD) was measured before and after the rub; and
   g. In this test, the lower the ΔOD, the better the durability.
   h. A ΔOD<0.15 is considered to be a good score.
2. Immediate Rub Test
   a. Hand held rubbing tool was used to assess the smearing of dried and cured ink immediately after printing;
   b. The tool used was fit with a rubber tip that when pushed down applied a constant pressure of 6 to 7 lbs;
   c. For the Immediate Rub Test, the delta optical density (ΔOD) was measured before and after the rub.
   d. In this test, the lower the ΔOD, the better the durability.
   e. A ΔOD<0.15 is considered a good score.

The Results for the Wet Rub Test and the Immediate Rub Test are provided in Table 7. Notably, the black Photo Curable Ink was printed as described and tested both with and without curing on both papers (SUG and RT1).

TABLE 7

| | With Curing | | Without Curing | |
|---|---|---|---|---|
| Paper | Wet Rub (ΔOD) | Immediate Rub (ΔOD) | Wet Rub (ΔOD) | Immediate Rub (ΔOD) |
| SUG | 0.12 | 0.11 | 1.89 | 0.89 |
| RTI | 0.09 | 0.05 | 1.45 | 0.75 |

As can be seen in Table 7 above, the black Photo Curable Ink exhibited significantly better wet rub and immediate rub resistance after curing. The initial OD was 2.02 and 1.63 on SUG and RT1, respectively, and therefore a ΔOD of 0.12, for example, indicates that after rubbing the print, only 0.12 OD units were lost from the initial 2.02 OD measurement. Conversely, without curing, a ΔOD of 1.89 means that that the ink lost significant OD units from the initial 2.02 OD measurement. The durability improvement by curing is evident in both Wet Rub and Immediate Rub measurements, suggesting that the polymeric TPO based photo initiator package efficiently participated in the curing and crosslinking of the Photo Curable Ink.

While the present technology has been described with reference to certain examples, those skilled in the art will appreciate that various modifications, changes, omissions, and substitutions can be made without departing from the spirit of the disclosure. It is intended, therefore, that the disclosure be limited only by the scope of the following claims.

What is claimed is:

1. A polymeric photo active agent, comprising diphenyl (2,4,6-trimethylbenzoyl)phosphine oxide modified with a polyether having from 2 to 200 ether groups.

2. The polymeric photo active agent of claim 1, wherein the polyether includes one of a polyethylene oxide or a polypropylene oxide.

3. The polymeric photo active agent of claim 1, wherein the polyether includes both a polyethylene oxide and a polypropylene oxide.

4. The polymeric photo active agent of claim 1, wherein the polyether is also a polyetheramine.

5. The polymeric photo active agent of claim 4, wherein the polyetheramine is a tertiary amine attached to polyethylene oxide, polypropylenene oxide, or a combination of both polyethylene oxide and polypropylene oxide.

6. The polymeric photo active agent of claim 1, comprising a second diphenyl(2,4,6-trimethylbenzoyl)phosphine oxide, wherein the diphenyl(2,4,6-trimethylbenzoyl)phosphine oxide and the second diphenyl(2,4,6-trimethylbenzoyl)phosphine oxide are attached together by the polyether.

7. The polymeric photo active agent of claim 1, having one of the following structures:

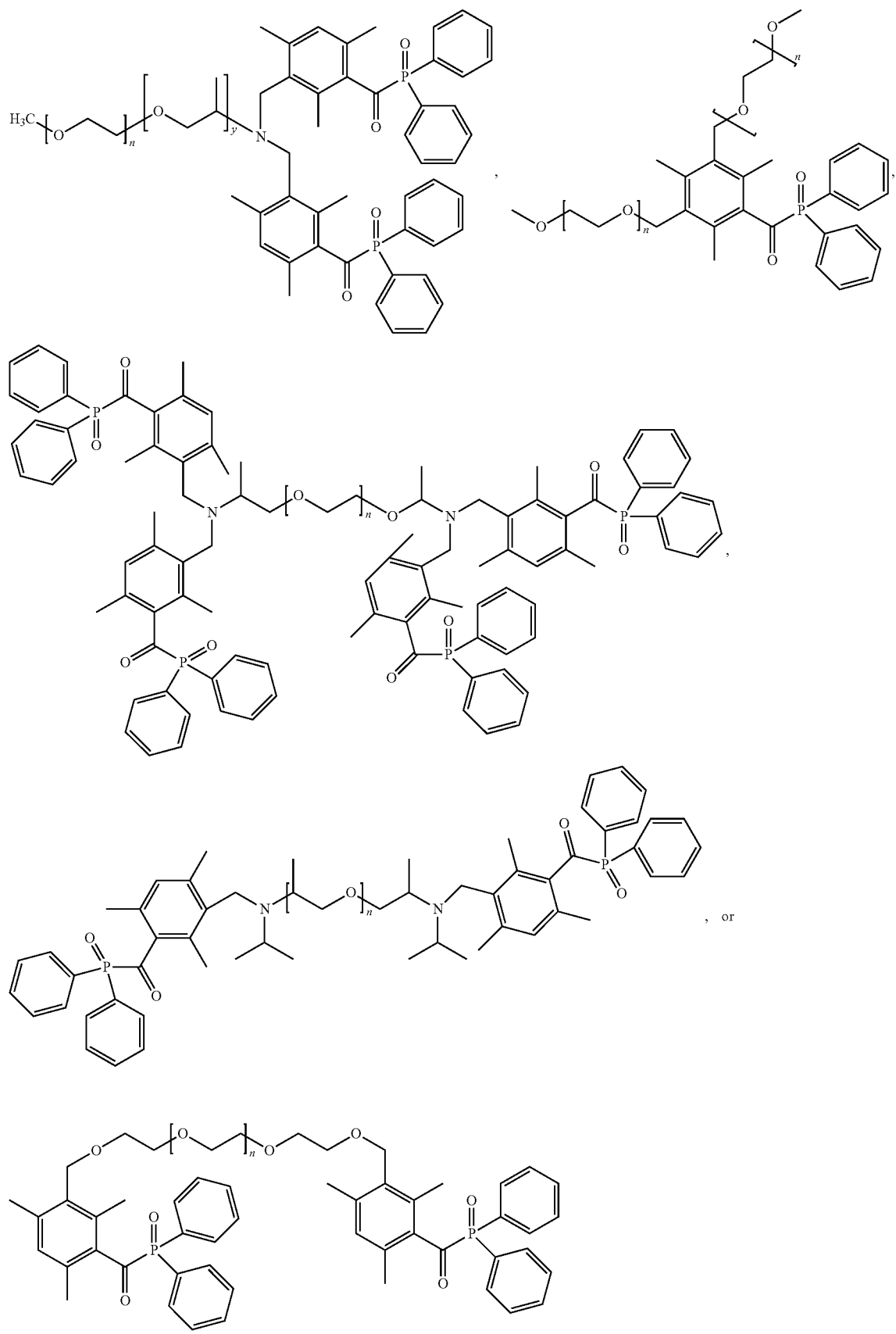

wherein n is from 0 to 200 and p is from 0 to 200 with the proviso that n+p is at least 2.

8. A photo curable ink, comprising:
a photo reactive binder;
a polymeric photo active agent comprising diphenyl(2,4,6-trimethylbenzoyl)phosphine oxide modified with a polyether having from 2 to 200 ether groups;
a co-photo initiator, a synergist, or combination thereof;
a colorant; and
a liquid vehicle including co-solvent and water.

9. The photo curable ink of claim 8, wherein the polyether includes a polyethylene oxide, a polypropylene oxide, or both a polyethylene oxide and a polypropylene oxide.

10. The photo curable ink of claim 9, wherein the polyether is also a polyetheramine.

11. The photo curable ink of claim 8, wherein the polymeric photo active agent includes a second diphenyl(2,4,6-trimethylbenzoyl)phosphine oxide, wherein the diphenyl(2,4,6-trimethylbenzoyl)phosphine oxide and the second diphenyl(2,4,6-trimethylbenzoyl)phosphine oxide are attached together by the polyether.

12. The photo curable ink of claim 8, wherein the photo curable ink has a pH of 7 to 12, wherein the polymeric photo active agent is stable in the photo curable ink, and wherein the photo curable ink is photo curable using UV LED electromagnetic radiation.

13. The photo curable ink of claim 8, wherein the polymeric photo active agent is a sensitizer and the photo curable ink includes the co-photo initiator.

14. The photo curable ink of claim 8, wherein the polymeric photo active agent is a photo initiator and the photo curable ink includes the synergist.

15. A method of making a photo curable ink comprising mixing a photo reactive binder; a co-photo initiator, a synergist, or combination thereof; a colorant; and a liquid vehicle including co-solvent and water with a polymeric photo active agent comprising diphenyl(2,4,6-trimethylbenzoyl)phosphine oxide modified with a polyether having from 2 to 200 ether groups.

16. The polymeric photo active agent of claim 1, wherein the polyether is bonded to a carbon in the 3-position or the 5-position of the 2,4,6-trimethyl benzoyl ring.

17. The polymeric photo active agent of claim 1, having one of the following structures:

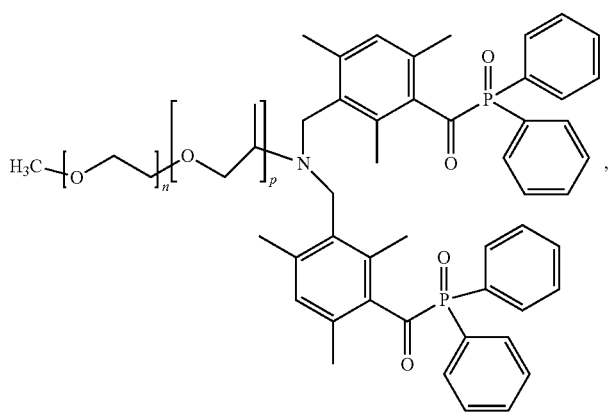 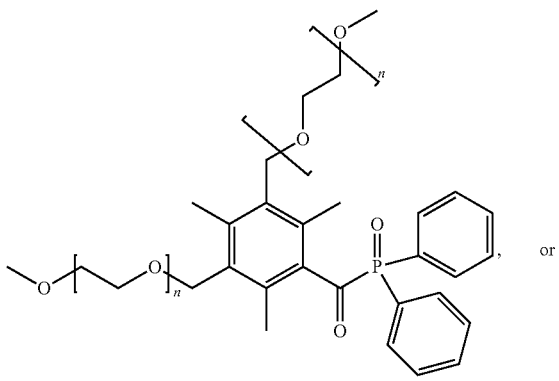, or

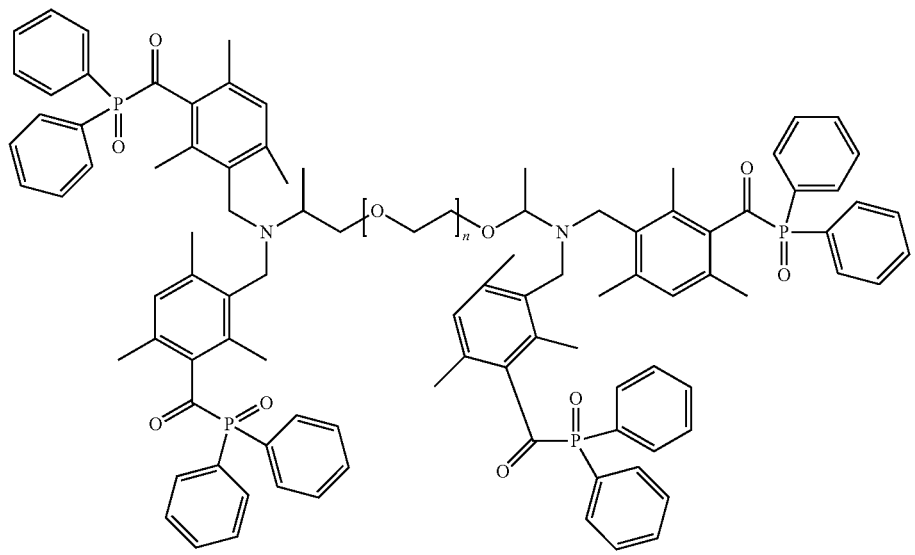

where n is from 0 to 200 and p is from 0 to 200 with the proviso that n+p is at least 2.

* * * * *